(12) United States Patent
Chen et al.

(10) Patent No.: US 7,166,306 B2
(45) Date of Patent: Jan. 23, 2007

(54) METHOD FOR PREPARATION OF BLOCK COPOLYMERIC NANOPARTICLES

(75) Inventors: Daoyong Chen, Shanghai (CN); Ming Jiang, Shanghai (CN); Huisheng Peng, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 353 days.

(21) Appl. No.: 10/357,979

(22) Filed: Feb. 4, 2003

(65) Prior Publication Data

US 2003/0229185 A1 Dec. 11, 2003

(30) Foreign Application Priority Data

Feb. 5, 2002 (CN) ................... 02 1 10775

(51) Int. Cl.
*A61K 9/14* (2006.01)
(52) U.S. Cl. ............ 424/489; 424/78.08; 424/78.17
(58) Field of Classification Search ........ 424/489, 424/78.08, 78.17; 428/402
See application file for complete search history.

(56) References Cited

U.S. PATENT DOCUMENTS

| | | | |
|---|---|---|---|
| 6,383,500 B1 * | 5/2002 | Wooley et al. ........... | 424/401 |
| 6,437,050 B1 | 8/2002 | Krom et al. | |
| 6,649,192 B2 | 11/2003 | Alonso Fernandez et al. | |

FOREIGN PATENT DOCUMENTS

| | | |
|---|---|---|
| EP | 0552802 | 7/1993 |
| EP | 1245276 | 10/2002 |
| WO | WO9749387 | 12/1997 |

OTHER PUBLICATIONS

Andrew Guo, Guojun Lio, Jian Tao, "Star Polymers and Nanospheres from Cross-Linkable Diblock Copolymers",*Macromolecules* 1996, vol. 29, No. 7.
David Mecerreyes, Victor Lee, Craig Hawker, James Hedrick, Andreas Wursch, Willi Volksen, Teddie Magbitang, Elbert Huang and Robert Miller, "A Novel Approach to Functionalized Nanoparticles: Self-Crosslinking of Macromolecules in Ultradilute Solution", *Advance Materials* 2001, 13, No. 3, Feb. 5, 2001.
Koji Ishizu, "Synthesis and Structural Ordering of Core-Shell Polymer Microspheres" *Prog. Polym. Sci.*, vol. 23, 1383-1408, 1998.
K. B. Thurmond II, Haiyong Huang, C. G. Clark, Jr. T. Kowalewski, K. L. Wooley. "Shell corss-linked polymer micelles: stabilized assemblies with great versatility and potential", *Colloids and Surfaces B: Biointerfaces* 16, (1999), 45-54.

* cited by examiner

*Primary Examiner*—Johann Richter
*Assistant Examiner*—Konata M. George
(74) *Attorney, Agent, or Firm*—Richard R. Clikeman

(57) ABSTRACT

A method for preparation of block copolymeric nanoparticles is disclosed. The method is a single-step preparation in which block copolymeric nanoparticles are produced directly from a solution of crosslinkable block copolymer in a carrier medium. The block copolymeric nanoparticles thus formed have at least one crosslinked polymeric phase.

12 Claims, No Drawings

METHOD FOR PREPARATION OF BLOCK COPOLYMERIC NANOPARTICLES

CROSS REFERENCE TO RELATED PATENT APPLICATIONS

This is a non-provisional application of prior pending Chinese application Ser. No. 02110775.0 filed Feb. 5, 2002.

The present invention relates to a method for preparation of block copolymeric nanoparticles having a crosslinked polymeric phase.

Block copolymeric nanoparticles are a new type of multi-functional nano material. Compared to small molecular micelles, block copolymeric nanoparticles are more stable, have higher carrier capacity, and are more flexible in structural design. Block copolymeric nanoparticles ("BCPNPs") can have many important applications in biology, medicine, chemistry and chemical engineering, specialty materials, and many other high technology areas. In biological and pharmaceutical areas, carriers made of block copolymeric nanoparticles can be used for drug formulation and controlled release. Because BCPNPs may have a core-shell structure, the requirements of carrying the active ingredient and controlling its release can be met by the design of the structure and composition of the core, and at the same time the requirements of compatibility of the system to the living body can be met by the design of the shell. In this regard, the properties of block copolymeric nanoparticles are superior to those of carrier and controlled release systems made by polymer encapsulation. In the areas of chemistry and chemical engineering, templates made from BCPNPs can be used to control the size and the shape of nano materials. Block copolymeric nanoparticles can also be used as confined reaction vessels for controlled synthesis of polymers, for catalytic reactions, and for the preparation of high performance catalytic systems. In the area of specialty materials, BCPNPs can be used to carry photo electronic functional materials.

A great deal of effort, both in manpower and funding, has been put into research directed toward block copolymeric nanoparticles and the trend indicates that the effort will continue to increase. However, up to now there has been no report on the commercial scale production of BCPNPs or related products. There are two reasons that make the commercial production impractical. One reason is the issue on the stability of micelles which current methods require to be generated during the first step of BCPNP preparation. There are many methods for preparing block copolymeric nanoparticles, the most common methods involve a procedure in which micelles are formed based on the solubility difference between the two blocks of a block copolymer in a selective solvent. In such a procedure, the formation of micelles is constrained by the composition of the solvent system and by the temperature. This sensitivity makes it difficult or impossible to the customization requirements of broad range of applications. The second reason is that the concentrations possible in the micelle systems are extremely low, obviating economic viability. The concentration of the block copolymeric nanoparticles produced by the existing methods is typically in the range of 0.01% to 0.1%, or even lower. People have spent much effort in order to solve the problems of instability and low concentration. U.S. Pat. No. B1-6,383,500 is representative of this work. The preparative procedure includes two successive steps in which micellization of a block copolymer occurs in a selective solvent and then the block copolymeric nanoparticles are stabilized as particles through crosslinking either the shell or the core of the micelles. The concentration of the resulting block copolymeric nanoparticles made by these methods is still low (lower than 1 mg/ml; occasionally as high as 10 mg/ml). The issue on concentration has not been well resolved.

We have surprisingly discovered a simple, relatively low cost method for preparing block copolymeric nanoparticles at high concentration. The preparative method obviates the need for a micelle generation step prior to BCPNP formation. Instead the block copolymeric nanoparticles are formed directly from block copolymers, at least one block of which is a crosslinkable block, dissolved in solvent through addition of a crosslinker for the crosslinkable block, inducing formation of block copolymeric nanoparticles dispersed in the solvent. BCPNP are therefore produced which have stable, well controlled structures and controlled sizes.

A first aspect of the present invention is directed to a method for the preparation of plural block copolymeric nanoparticles, said method including the steps of:
  (a) forming a solution by dissolving a crosslinkable block copolymer in a carrier medium;
  (b) combining at least one crosslinking agent with said solution;
  (c) reacting said crosslinking agent with said crosslinkable block copolymer; and
  (d) optionally, isolating said block copolymeric nanoparticles;
wherein:
  (i) said crosslinkable block copolymer comprises at least one crosslinkable block and at least one non-crosslinkable block; and
  (ii) said crosslinkable block comprises at least one crosslinkable group, or at least one group modifiable to produce a crosslinkable group.

A second aspect of the present invention is the method of the first aspect of the present invention including the further steps of:
  adding an ingredient; and
  incorporating said ingredient into said block polymeric nanoparticle;
  wherein said ingredient is an ingredient selected from the group consisting of: pharmaceutically active agent, cosmetic, fragrance, flavor, carrier solvent, diluent, pesticide, herbicide, fertilizer, antimicrobial, colorant, odor absorbing agent, fat absorbing agent, toxin absorbing agent, UV-absorber, liquid crystal, electrically active agent, optically active agent, and combinations thereof.

A third aspect of the present invention is the method of the first aspect of the present invention including the further steps of:
  adding one or more reactants suitable for incorporation into said block polymeric nanoparticles;
  incorporating said reactants into said block polymeric nanoparticles; and
  reacting said reactants within said block polymeric nanoparticles.

The term "(meth)acryl" refers to both "acryl" and "methacryl". For example, "methyl (meth)acrylate" refers to both "methyl acrylate" and "methyl methacrylate".

A "crosslinkable block copolymer" is a block copolymer having at least one "crosslinkable block" and at least one non-crosslinkable block.

A "crosslinkable block" is a polymeric chain bearing at least one "crosslinkable group".

A "crosslinkable group" is any functional group chemically reactive, with "the crosslinking agent" of the present invention to form a chemical bond.

A "crosslinking agent" is any agent which, when added to a solution of "crosslinkable block copolymer", is capable of reacting with the "crosslinkable groups" present on a crosslinkable block of the crosslinkable block copolymer.

A "carrier medium" is any substance or miscible combination of substances (e.g., a solvent or combination of solvents) which: dissolves the crosslinkable block copolymer; allows the crosslinking agent to diffuse, or be transported, to the crosslinkable group; does not react with the crosslinking agent to any significant degree; does not react with the crosslinkable block copolymer to any significant degree; and, upon crosslinking, allows the resultant "block copolymeric nanoparticle" to form a stable dispersion therein. See the discussion of Van Krevelen methodology infra.

A "block copolymeric nanoparticle" ("BCPNP") is any polymeric nanoparticle formed from a crosslinkable block copolymer, by crosslinking that block with a "crosslinking agent", and wherein polymeric nanoparticles thus formed have an average particle size, $d_z$, of typically 0.005 microns to 0.200 microns, preferably 0.005 to 0.100, more preferably 0.010 to 0.050, and most preferably 0.020 microns to 0.40 microns. All ranges used herein are inclusive and combinable.

Molecular Weight. Synthetic polymers are often a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantifying the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

$$MWD = M_w/M_n$$

where:
  $M_i$ = molar mass of $i^{th}$ component of distribution
  $W_i$ = weight of $i^{th}$ component of distribution
  $N_i$ = number of chains of $i^{th}$ component and the summations are over all the components in the distribution. While MWD will be used herein to denote distributions of molecular weights, degree of polymerization will be used to characterize the length of polymeric chains, including polymeric blocks. The "degree of polymerization" is the number of monomeric units that, after polymerization, are contained in a given polymeric chain or block as polymerized monomeric units.

"Particle size" is the diameter of a particle. The "average particle size" for the examples is the z average particle size, which is defined as $$d_z = \Sigma(N_i M_i^3)/\Sigma N_i M_i^2,$$

and is determined by the Dynamic Light Scattering (DLS) measurements well-known in the art. The polydispersity index of the "particle size distribution" ("PSD"), also calculated from DLS measurements, is $\mu_2/<\Gamma>^2$, defined as the relative line width of the curve of hydrodynamic radius distributions. This definition, with small values indicating narrower distributions, has been widely accepted. Values for, $\mu_2/<\Gamma>^2$ may be greater than 0.8. However, values of 0.01 to 0.8 are preferred. More preferred are values of 0.03 to 0.40, and most preferred are values of 0.03 to 0.20.

Estimation of whether a polymer, polymeric block, or low molecular weight substance (e.g., a solvent) and another component (e.g., another polymer or low molecular weight substance, such as a solvent) will be miscible may be made according to the well-known methods delineated in D. W. Van Krevelen, *Properties of Polymers*, 3$^{rd}$ Edition, Elsevier, pp. 189–225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents, polymers, and polymer segments, and can be estimated using the group contribution methods of Van Krevelen. For example, to estimate whether a block having a given composition will be miscible with a particular solvent, one calculates $\delta_t^2$ for the polymeric block and $\delta_t^2$ for the solvent. Typically, if the difference between the two, $\Delta\delta_t^2$, is greater than 25 (i.e., $\Delta\delta_t > 5$), then the polymer and the solvent will not be miscible. Conversely, if $\Delta\delta_t^2$ is less than or equal to 25 (i.e., $\Delta\delta_t$ is less than or equal to 5), the polymeric block and the solvent will be miscible. It, of course, should be noted that this calculation is an estimation, so a value 25 for $\Delta\delta_t^2$, is a approximate cut-off point for miscibility. These calculations are particularly useful for determining if a particular solvent will dissolve a particular polymer or block copolymer. When polymer/polymer interactions are considered, it is found that two polymers become immiscible at lower values of $\Delta\delta_t$ than is the case with polymer-solvent interaction. As the chain length of either or both polymers increases, the maximum value of $\Delta\delta_t$ value required to indicate miscibility drops to values of, for example, 3 or less due, at least in part, to reduction in the number of degrees of freedom possible as polymeric chains grow in length. The cut-off value $\Delta\delta_t$ denoting miscibility drops even further to, for example, 2 or less when one of the polymers is crosslinked (an extreme example of loss of degrees of freedom in chain motion due to both high molecular weight and increase in number of points of attachment of chain segments to a growing network structure. Of course, there do exist polymer pairs for which each polymer bears functional groups having attraction for functional groups of the other member of the pair. In such cases, the two polymers of the pair may be miscible at calculated values of $\Delta\delta_t$ which are greater than 3.

Therefore, when a crosslinkable block of the crosslinkable block copolymer of the present invention becomes crosslinked, the resulting crosslinked polymer network tends to segregate to form a crosslinked polymeric phase separate from at least one other phase which includes "non-crosslinkable blocks" initially present in the crosslinkable block copolymer and retained in the BCPNP. The extent to which such segregation occurs is dependent upon the value of $\Delta\delta_t$ and the degree of crosslinking.

A block copolymeric nanoparticle can include a single phase, two phases or multiple phases, governed by the considerations enumerated supra. When multiple phases are present, the phases may be present in the BCPNP as a core/shell morphology in which the shell is: uniform, continuous and impermeable; uniform, continuous, and permeable; discontinuous at a single locus (e.g., a single hole in the shell); discontinuous at two or more loci (e.g., multiple pores in the shell). When two or more phases are present having a core/shell morphology, a preferred embodiment is multiple concentric shells, around a central core. In another embodiment of the present invention, multiple phases having the same composition (e.g., crosslinked polymeric phases) are present within a second phase. The shape of a BCPNP may be, for example, spherical, ellipsoidal (e.g., oblate or prolate), or cylindrical, or any other shape dictated by kinetic and thermodynamic considerations. When the BCPNP is non-spherical, its aspect ratio, i.e., the ratio of longest axis to shortest axis is typically 1 to 10, preferably 1 to 5, more preferably 1 to 3, and most preferably 1 to 2. A particularly preferred BCPNP is a BCPNP having a core-shell morphology in which the core is crosslinked, i.e., derived by crosslinking of the crosslinkable block, and the shell includes the non-crosslinkable block, and wherein the shell provides stabilization to the BCPNP dispersed in the carrier medium. Formation of BCPNPs having these core/shell structures may be advantageously achieved by selecting a non-crosslinkable block of the crosslinkable block copolymer to be miscible with the carrier medium and selecting the crosslinkable block of the crosslinkable block copolymer to be less miscible than the non-crosslinkable block with the carrier medium. Under such conditions, formation of BCPNP during crosslinking is encouraged, wherein the BCPNP has a crosslinked core, and wherein the BCPNP is stabilized in dispersed form in the carrier medium by the non-crosslinked miscible shell. Non-crosslinked blocks that are calculated to be miscible with the carrier medium (e.g., DMF) will be particularly useful as a shell affording stabilization of the BCPNPs. It should, however, be recognized that it is not a necessary condition that the crosslinkable block be less miscible in the carrier medium than the non-crosslinkable block because, upon crosslinking, the crosslinkable block becomes part of the crosslinked polymeric phase, which has the effect of greatly reducing its solubility in the carrier medium (see van Krevelen supra).

The average particle size, $d_z$, of the BCPNP of the present invention is typically 0.005 microns to 0.200 microns, preferably 0.005 to 0.100, more preferably 0.010 to 0.050, and most preferably 0.020 microns to 0.40 microns. The polydispersity index of polydispersity index of the PSD of the plural BCPNPs is preferably 0.01 to 0.80, more preferably 0.03 to 0.40, and most preferably 0.03 $\mu_2/<\Gamma>^2$ to 0.20, $\mu_2/<\Gamma>^2$, as characterized by DLS.

The carrier medium useful in the present invention has been described supra. Any substance fitting that description may be useful in the invention. A non-exhaustive list of particularly useful substances includes these solvents: chloroform, dimethylformamide (DMF), dimethylsulfoxide (DMSO), benzene, water, tetrahydrofuran (THF), toluene, xylenes, dichloromethane, hexane, heptane, and their miscible blends.

This invention uses a simple method to make block copolymeric nanoparticles in one step. Because the method of the present invention eliminates the step of crosslinkable block copolymer micellization, block copolymeric nanoparticles at high concentration are made directly, the need for a micelle forming step is eliminated, and the need to use excessive amounts of solvent is eliminated. The BCPNPs of the present invention are formed by dissolving a crosslinkable block copolymer in a suitable carrier medium. A crosslinking agent is added which reacts with the crosslinkable block of the crosslinkable block copolymer, resulting in the formation of BCPNPs stabilized in the carrier medium by the non-crosslinkable blocks. The reaction temperature for the crosslinking reaction may typically range from −25° C. to 250° C. dependent upon characteristics of carrier medium, crosslinking agent, crosslinkable block copolymer, BCPNP product and crosslinking kinetics. Preferably, the reaction temperature is 0 to 150° C., more preferably 20 to 125° C., and most preferably 25 to 100° C. Depending on reaction kinetics, the reaction time for crosslinking and formation of BCPNPs is typically 10 seconds to 2 weeks, preferably 1 minute to 2 weeks, more preferably 15 minutes to one week, and most preferably 30 minutes to 12 hours. The non-crosslinkable blocks protect the BCPNP, once formed, from other BCPNPs, so that bulk crosslinking is eliminated, or greatly reduced. As a result, the concentration of crosslinkable block copolymer can be much higher than can be achieved using processes requiring the step of crosslinkable block copolymer micelle formation in a step prior to crosslinking. In such procedures, concentrations of intermediates and final products of less than 0.01 weight percent are common. In contrast, the present invention, which eliminates such micelle formation steps, uses concentrations of crosslinkable block copolymer in carrier medium of typically 0.1 weight percent to 30 weight percent, preferably greater than 1 weight percent to 30 weight percent, based on the weight of total solution, more preferably 2 to 20 wt %, and most preferably 5 to 10 weight percent based on weight of total solution. Typically, the concentration of BCPNP, as formed in the crosslinking step, is 0.1 weight percent to 30 weight percent, based on the weight of total solution, preferably greater than 1 wt % to 30 wt %, more preferably 2 to 20 wt %, and most preferably 5 to 10 weight percent based on weight of total solution. Block copolymers and crosslinking agents useful in the present invention may be chosen from those disclosed in U.S. Pat. No. B1-6,383,500.

The "degree of polymerization", ("DP"), of the crosslinkable block copolymer is preferably 4 to 3,000, and more preferably 12 to 1,200. The DP of the crosslinkable block is preferably 2 to 1,000, more preferably 2 to 200, and most preferably 4 to 100. The DP of the non-crosslinkable block is preferably 2 to 2,000, more preferably 5 to 1,000, and most preferably 10 to 200.

The amount of the crosslinking agent useful in the present invention is typically 0.01 to 50 times the stoichiometric quantity, preferably 0.05 to 10, more preferably 0.1 to 5, most preferably 0.2 to 2. In a given reaction system, a stoichiometric quantity of crosslinking agent is that amount of crosslinking agent having a total number of crosslinking groups equal to the total number of crosslinkable groups present in all of the crosslinkable blocks of the crosslinkable block copolymer present in the reaction system. In certain embodiments of the present invention, use of extremely low, or extremely high amounts of crosslinking agent may be indicated. For example: if the "degree of polymerization" ("DP") of the crosslinkable block is higher than 1000, the amount of crosslinking agent can be less than 0.05; or, if the DP of the non-crosslinkable block is higher than 1000, and the ratio between DP of the non-crosslinkable block and the DP of crosslinkable block is larger than 20:1, the amount of crosslinking agent can be much larger than 10 times the stoichiometric quantity. Too much crosslinking agent will waste the material and too little crosslinking agent will result in adverse effect on the formation of a separate crosslinked phase (e.g., a crosslinked core).

The crosslinkable blocks of the crosslinkable block copolymer of the present invention can be chosen from those disclosed in U.S. Pat. No. B1-6,383,500. A non-exhaustive list of the polymers of which the crosslinkable blocks are comprised includes homopolymers and copolymers of substituted, or non-substituted: 4-vinylpyridine, 2-vinylpryidine, 4-pyridyl substituted alkyl (meth)acrylates, 2-pyridyl substituted alkyl (meth)acrylates, 4-pyridyl substituted aryl (meth)acrylates, 2-pyridyl substituted aryl (meth)acrylates, polyglycine, polylysine, polylysine partially substituted with pyridyldithioproprionyl groups; and other monomers bearing, for example, carboxyl, amino, hydroxyl, epoxy groups, acetoacetyoxy groups, or combinations thereof.

The crosslinkable block of the present invention may derive from crosslinkable groups present on one or more monomers which were polymerized to form the block, or may be formed by any appropriate means of modification that affords crosslinkable groups attached to the block. For example, when a block is poly(styrene), that poly(styrene) block can be chemically modified by chloromethylation to become crosslinkable. Subsequent crosslinking may then be achieved by reaction with a diamine compound. When subsequent functionalization of a block produces a double bond capable of free radical polymerization, or when such double bonds already exist as crosslinkable groups, crosslinking reaction can be initiated with the addition of an initiator, or heating, or exposure to UV-light after the addition of a photosensitive agent. For example, a carbon double bond can be introduced to a poly(styrene) block via Friedel-Crafts reaction before adding an initiator for polymerization. Crosslinkable groups, such as cinnamate, are particularly useful for photoinitiation. After dissolving the block copolymers containing a double bond in a solvent, treating the system with heat, or with heat after adding an initiator, or exposing it to UV-light, or exposing it to UV-light after adding a photosensitive agent, depending on the actual system, can also result in crosslinking reaction of the block bearing double bonds. With adequate stirring, block copolymeric nanoparticles can be formed.

Initiators useful in the present invention may be chosen from those disclosed in U.S. Pat. No. B1-6,383,500.

The non-crosslinkable blocks of the present invention can be chosen from those disclosed in U.S. Pat. No. B1-6,383,500. Preferred non-crosslinkable blocks include, in substituted, or unsubstitued form, poly(styrene), poly(ethylene oxide), poly[alkyl (meth)acrylate], poly[aryl (meth)acrylate], polybutadiene, polyisoprene, polycaprolactone, polycaprolactam, polysiloxane, polypropylene oxide, polyalkylene oxide, polyethylene, polypropylene, other polyolefins, poly(olefin/(meth)acrylate)s and combinations thereof.

The ratio of the crosslinkable block to the non-crosslinkable block in the crosslinkable block copolymer of the present invention, expressed in relative degree of polymerization (i.e., ratio of degree of polymerization of crosslinkable block to degree of polymerization of non-crosslinkable block) is typically 1:50 to 50:1, preferably 1:50 to 10:1, more preferably 1:10 to 5:1, and most preferably 1:4 to 2:1.

The crosslinking agent of the present invention is any substance capable of reacting with the crosslinkable groups of the crosslinkable blocks of the crosslinkable block copolymer of the present invention. Crosslinking agents are molecules bearing two or more groups capable of reacting with the crosslinkable groups of the crosslinkable block. A non-exhaustive list of such crosslinkable groups includes, but is not limited to, thiol, bromo, chloro, iodo, hydroxy, amino, isocyanato, carboxyl, and combinations thereof. Preferred crosslinking agents include dibromoalkanes, diiodoalkanes, tribromoalkanes, triiodoalkanes, alkanedithiols, and alkanetrithiols. Crosslinking agents include, for example, multifunctional compounds such as polyols, polyamines, polyethyleneglycol multiarm stars, polycaroxylic acids, polycarboxylic acid halides, polyisocyanates, polymeric aromatic isocyanates, polyalkylhalides, polysulfonates, polysulfates, polyphosphonates, polyphosphates, alkyldiamines, alkanediols, ethanolamine, poly(oxyethylene), amino-substituted poly(oxyethylene), diamino-substituted poly(oxyethylene), polyamino-scubstituted alcohols, substituted dendrimers, and substituted hyperbranched polymers. The crosslinking agent can, for example, be chosen from those disclosed in U.S. Pat. No. B1-6,383,500. When the crosslinkable block contains crosslinkable groups which are double bonds polymerizable by free radical polymerization, the crosslinking agent can be a multi-ethylenically unsaturated substance having double bonds which can be reacted with the crosslinkable groups by free radical means. Examples of representative of multiethylenically unsaturated crosslinking agents include multi-(meth)acrylates, multi-allylics, and allyl methacrylate. Particularly preferred embodiments of the present invention are those in which the crosslinking agent is 1,4-dibromobutane or 1,3-propanedithiol.

The crosslinkable block copolymer of the present invention may have more than two blocks. Those crosslinkable and non-crosslinkable blocks can be chosen from those disclosed in U.S. Pat. No. B1-6,383,500. A non-exhaustive list of tri-block copolymers of this type includes polystyrene-b-poly(methyl methacrylate)-b-poly(acrylic acid), poly(methyl methacrylate)-b-poly(4-vinylpyridine)-b-poly(methyl methacrylate), poly(methyl methacrylate)-b-poly(2-vinylpyridine)-b-poly(methyl methacrylate), poly(methyl methacrylate)-b-poly(acrylate acid)-b-poly(methyl methacrylate), polystyrene-b-poly(methyl methacrylate)-b-poly(methacrylate acid), polystyrene-b-poly(acrylate acid)-b-polystyrene, and other triblock copolymers with only one crosslinkable block. Preparation of BCPNPs having $d_z$ in the range 0.005 to 0.020 microns is particularly facilitated by the use of crosslinkable tri-block copolymers having a crosslinkable block in the middle, and non-crosslinkable blocks on each end. The degree of polymerization of the blocks in such tri-block polymers is typically in the range 2 to 20, with DPs of 2 to 8 preferred to prepare BCPNPs having particle sizes of 0.010 microns or less.

Block copolymeric nanoparticles can have many important applications in biology, medicine, chemistry and chemical engineering, specialty materials, and many other high technology areas. The BCPNPs of the present invention can be used in any of the applications disclosed in U.S. Pat. No. B1-6,383,500. In biological and pharmaceutical area, block copolymeric nanoparticles can be used for drug formulation and controlled release. Particularly preferred block copolymeric nanoparticles are those having a core-shell morphology. The requirements of transporting the active ingredient and controlling its release can be met by the design of the structure and composition of the core, and at the same time the requirements of compatibility of the BCPNP to the living body can be met by the design of the shell. In this regard, the properties of block copolymeric nanoparticles are superior to those of controlled release systems made by polymer encapsulation. In chemistry and chemical engineering area, templates made from block copolymeric nanoparticles can be used to control the size and the shape of nano materials.

Block copolymeric nanoparticles can also be used as confined reaction vessels for controlled synthesis of polymers, for catalytic reactions, and for the preparation of high performance catalytic systems. In the area of specialty materials, block copolymeric nanoparticles can be used to carry photo electronic functional materials.

Another aspect of the present invention includes the further steps of: adding an ingredient; and incorporating said ingredient into said block polymeric nanoparticle; further step of adding an ingredient, wherein the ingredient is an ingredient selected from the group consisting of: pharmaceutically active agent, cosmetic, fragrance, flavor, carrier solvent, diluent, pesticide, herbicide, fertilizer, antimicrobial, colorant, odor absorbing agent, fat absorbing agent, toxin absorbing agent, UV-absorber, liquid crystal, electically active agent, optically active agent, and combinations thereof.

Another aspect of the present invention includes the further steps of: adding one or more reactants suitable for incorporation into said block polymeric nanoparticles; incorporating said reactants into said block polymeric nanoparticle; and reacting said reactants within said block polymeric nanoparticles.

Block copolymeric nanoparticles may be isolated from their dispersions by any means know to the art, including, for example: by addition of a non-solvent, or destabilizing electrolyte, to cause precipitation by, e.g., coagulation, followed by filtration; by spray drying, freeze drying, tray drying, or other evaporative technique. Oven drying, with or without vacuum, may also be desirable in some cases after initial isolation. In solid form, the BCPNP of the present invention can, optionally, be redispersed by adding a solvent in which the non-crosslinkable blocks are miscible.

EXAMPLE 1

Preparation of BCPNPs having a Crosslinked Core, using pSty-b-P4VP and Crosslinking Agent 1,4-dibromobutane.

The crosslinkable block copolymer sample used was pSty-b-P4VP, (Polystyrene-block-poly(4-vinyl pyridine)). The weight average molecular weight (Mw) of the block copolymer was 39,000, the molecular weight of the psty block and the P4VP block were 20,800 and 18,200, respectively. The polydispersity index of the block copolymer was 1.41. The crosslinking agent used was 1,4-dibromobutane and DMF was used as the solvent.

The pSty-b-P4VP block copolymer was dissolved in DMF to form a solution having a concentration of 5 mg/mL. Crosslinking agent 1,4-dibromobutane was then added to the solution in an amount giving a molar ratio of 1,4-dibromobutane to the polymerized 4-vinyl pyridine monomer of 2:1. The crosslinking reaction was carried out at room temperature during 30 hours.

The average particle size, $d_z$, and polydispersity index of the PSD of the block copolymeric nanoparticles were characterized by dynamic light scattering (DLS) to be 160 nm and 0.43, respectively. The core-shell structure with pSty as the shell and crosslinked P4VP as the core was proved by TEM and $H^1$-NMR analysis.

EXAMPLE 2

Preparation of Core/shell BCPNPs having a Crosslinked Core, using pSty-b-P4VP and Crosslinking Agent 1,4-dibromobutane.

This example was carried out according to the method of Example 1, except that the concentration of the block copolymer pSty-b-P4VP was 50 mg/mL. The average particle size, $d_z$, and polydispersity index of the PSD of the block copolymeric nanoparticles were characterized by dynamic light scattering (DLS) to be 93 nm and 0.36, respectively. The core-shell structure with pSty as the shell and crosslinked P4VP as the core was proved by TEM and $H^1$-NMR analysis.

EXAMPLE 3

Preparation of Core/shell BCPNPs having a Crosslinked Core, using pSty-b-P4VP and Crosslinking Agent 1,4-dibromobutane.

This example was carried out according to the method of Example 1, except that the concentration of the block copolymer pSty-b-P4VP was 100 mg/mL. The average particle size, $d_z$, and polydispersity index of the PSD of the block copolymeric nanoparticles were characterized by dynamic light scattering (DLS) to be 54 nm and 0.42, respectively. The core-shell structure with pSty as the shell and crosslinked P4VP as the core was proved by TEM and $H^1$-NMR analysis.

EXAMPLE 4

Preparation of Core/shell BCPNPs having a Crosslinked Core, using pSty-b-P4VP and Crosslinking Agent 1,4-dibromobutane.

This example was carried out according to the method of Example 1, except that the concentration of the block copolymer pSty-b-P4VP was 200 mg/mL. The average particle size, $d_z$, and polydispersity index of the PSD of the block copolymeric nanoparticles were characterized by dynamic light scattering (DLS) to be 160 nm and 0.6, respectively. The core-shell structure with pSty as the shell and crosslinked P4VP as the core was proved by TEM and $H^1$-NMR analysis.

EXAMPLE 5

Preparation of Core/shell BCPNPs having a Crosslinked Core, using pSty-b-P4VP and Crosslinking Agent 1,4-dibromobutane.

The block copolymer sample used was pSty-b-P4VP (Polystyrene-block-poly(4-vinyl pyridine)). The weight average molecular weight (Mw) of the block copolymer was 20,500, the molecular weight of the pSty block and the P4VP block were 11,800 and 8,700, respectively. The polydispersity index of the block copolymer was 1.09. The crosslinking agent used was 1,4-dibromobutane and DMF was used as the solvent.

The pSty-b-P4VP block copolymer was dissolved in DMF to form a solution having a concentration of 10 mg/mL. Crosslinking agent 1,4-dibromobutane was then added to the solution in an amount giving a molar ratio of 1,4-dibromobutane to the polymerized 4-vinyl pyridine monomer of 2:1. The crosslinking reaction was carried out at room temperature during 30 hours.

The average particle size, $d_z$, and polydispersity index of the PSD of the block copolymeric nanoparticles were characterized by dynamic light scattering (DLS) to be 130 nm and 0.65, respectively. The core-shell structure with psty as the shell and crosslinked P4VP as the core was proved by TEM and $H^1$-NMR analysis.

EXAMPLE 6

Preparation of Core/shell Block Copolymeric Nanoparticles having a Crosslinked Core, using pSty-b-P4VP and Crosslinking Agent 1,4-dibromobutane.

This example was carried out according to the method of Example 5, except that the concentration of the block copolymer pSty-b-P4VP was 50 mg/mL. The average particle size, $d_z$, and polydispersity index of the PSD of the block copolymeric nanoparticles were characterized by dynamic light scattering (DLS) to be 96 nm and 0.53, respectively. The core-shell structure with pSty as the shell and crosslinked P4VP as the core was proved by TEM and $H^1$-NMR analysis.

EXAMPLE 7

Preparation of Core/shell Block Copolymeric Nanoparticles having a Crosslinked Core, using pSty-b-P4VP and Crosslinking Agent 1,4-dibromobutane.

This example was carried out according to the method of Example 5, except that the concentration of the block copolymer pSty-b-P4VP was 100 mg/mL. The average particle size, $d_z$, and polydispersity index of the PSD of the block copolymeric nanoparticles were characterized by dynamic light scattering (DLS) to be 65 nm and 0.45, respectively. The core-shell structure with psty as the shell and crosslinked P4VP as the core was proved by TEM and $H^1$-NMR analysis.

EXAMPLE 8

Preparation of Core/shell Block Copolymeric Nanoparticles having a Crosslinked Core, using pSty-b-P4VP and Crosslinking Agent 1,4-dibromobutane.

This example was carried out according to the method of Example 5, except that the concentration of the block copolymer pSty-b-P4VP was 300 mg/mL. The average particle size, $d_z$, and polydispersity index of the PSD of the block copolymeric nanoparticles were characterized by dynamic light scattering (DLS) to be 93 nm and 0.42, respectively. The core-shell structure with psty as the shell and crosslinked P4VP as the core was proved by TEM and $H^1$-NMR analysis.

EXAMPLE 9

Preparation of Core/shell Block Copolymeric Nanoparticles having a Crosslinked Core, using pSty-b-P2VP and Crosslinking Agent 1,4-dibromobutane.

The block copolymer sample used was pSty-b-P2VP (Polystyrene-block-poly(2-vinyl pyridine)). The weight average molecular weight (Mw) of the block copolymer was 26,800, the molecular weight of the psty block and the P4VP block were 14,300 and 12,500, respectively. The polydispersity index of the block copolymer was 1.32. The crosslinking agent used was 1,4-dibromobutane and DMF was used as the solvent.

The pSty-b-P4VP block copolymer was dissolved in DMF to form a solution having a concentration of 10 mg/mL. Crosslinking agent 1,4-dibromobutane was then added to the solution in an amount giving a molar ratio of 1,4-dibromobutane to the polymerized 2-vinyl pyridine monomer of 2:1. The crosslinking reaction was carried out at 100° C. during 24 hours.

The average particle size, $d_z$, and polydispersity index of the PSD of the block copolymeric nanoparticles were characterized by dynamic light scattering (DLS) to be 90 nm and 0.25, respectively. The core-shell structure with pSty as the shell and crosslinked P2VP as the core was proved by TEM and $H^1$-NMR analysis.

EXAMPLE 10

Preparation of Core/shell Block Copolymeric Nanoparticles having a Crosslinked Core, using pSty-b-P2VP and Crosslinking Agent 1,4-dibromobutane.

This example was carried out according to the method of Example 9, except that the concentration of the block copolymer pSty-b-P2VP was 50 mg/mL. The average particle size, $d_z$, and polydispersity index of the PSD of the block copolymeric nanoparticles were characterized by dynamic light scattering (DLS) to be 65 nm and 0.42, respectively. The core-shell structure with psty as the shell and crosslinked P2VP as the core was proved by TEM and $H^1$-NMR analysis.

EXAMPLE 11

Preparation of Core/shell Block Copolymeric Nanoparticles having a Crosslinked Core, using pSty-b-P2VP and Crosslinking Agent 1,4-dibromobutane.

This example was carried out according to the method of Example 9, except that the concentration of the block copolymer pSty-b-P2VP was 80 mg/mL. The average particle size, $d_z$, and polydispersity index of the PSD of the block copolymeric nanoparticles were characterized by dynamic light scattering (DLS) to be 45 nm and 0.32, respectively. The core-shell structure with psty as the shell and crosslinked P2VP as the core was proved by TEM and $H^1$-NMR analysis.

EXAMPLE 12

Preparation of Core/shell Block Copolymeric Nanoparticles having a Crosslinked Core, using pSty-b-P2VP and Crosslinking 1,4-dibromobutane.

This example was carried out according to the method of Example 9, except that the concentration of the block copolymer pSty-b-P2VP was 100 mg/mL. The average particle size, $d_z$, and polydispersity index of the PSD of the block copolymeric nanoparticles were characterized by dynamic light scattering (DLS) to be 30 nm and 0.22, respectively. The core-shell structure with pSty as the shell and crosslinked P2VP as the core was proved by TEM and $H^1$-NMR analysis.

EXAMPLE 13

Preparation of Core/shell Block Copolymeric Nanoparticles having a Crosslinked Core, using PEO-b-P2VP and Crosslinker 1,4-dibromobutane.

The block copolymer sample used was PEO-b-P2VP (Poly (ethylene oxide)-block-poly (2-vinyl pyridine)). The weight average molecular weight (Mw) of the block copolymer was 11,000, the molecular weight of the PEO block and the P2VP block are 5,000 and 6,000, respectively. The polydispersity index of the block copolymer was 1.32. The crosslinker used was 1,4-dibromobutane and DMF was used as the solvent.

The pSty-b-P4VP block copolymer was dissolved in DMF to form a solution having a concentration of 50 mg/mL. Crosslinker 1,4-dibromobutane was then added to the solution in an amount giving a molar ratio of 1,4-dibromobutane to the polymerized 2-vinyl pyridine monomer of 2:1. The crosslinking reaction was carried out at room temperature during one week.

The average particle size, $d_z$, and polydispersity index of the PSD of the block copolymeric nanoparticles were characterized by dynamic light scattering (DLS) to be 40 nm and 0.20, respectively. The core-shell structure with pSty as the shell and crosslinked P2VP as the core was proved by TEM and $H^1$-NMR analysis.

EXAMPLE 14

Preparation of Core/shell Block Copolymeric Nanoparticles having a Crosslinked Core, using PEO-b-polylysine, Partially Substituted with pyridyldithiopropionyl Groups, and Crosslinking Agent 1,3-propanethiol.

The block copolymer sample used was PEO-b-Polylysine, Poly(ethylene oxide)-block-poly(lysine). The polylysine block was partially substituted by pyridyldithiopropionyl groups (i.e., 30% of the lysine units were substituted). The weight average molecular weight (Mw) of the block copolymer was 9,600, the molecular weight of the PEO block and the polylysine block are 5,000 and 4,600, respectively. The polydispersity index of the block copolymer was 1.32. The crosslinking agent used was 1,3-propanethiol, and DMF was used as the solvent.

The PEO-b-polylysine block copolymer was dissolved in DMF to form a solution having a concentration of 100 mg/mL. Crosslinking agent 1,3-propanethiol was then added to the solution in an amount giving a molar ratio of sulfur alcohol to the polymerized lysine monomer of 0.8 to 1.0. The crosslinking reaction was carried out at 25° C. during two weeks. The average particle size, $d_z$, of the block copolymeric nanoparticles characterized by dynamic light scattering (DLS) to be 32 nm, respectively.

EXAMPLE 15

Preparation of BCPNPs from a Crosslinkable Triblock Copolymer.

A triblock copolymer, poly(ethylene oxide)$_8$-b-poly(lysine)$_5$-b-poly(ethylene oxide)$_8$, (the subscripts denote the number of repeat units of the respective block) is dissolved in water at a concentration of 5 wt %. Crosslinking agent, 1,4-dicarboxyl butane, is added at a level at a stoichiometric amount to react with the amino groups in the polylysine block to form crosslinks. The crosslinking reaction is carried out at room termperature, during 24 hours, in the presence of a catalytic amount (approximately 5 mole percent, based on 1,4-dicarbocyl butane) of 1-(3-(dimethylamino)propyl)-3-ethylcarbodimide methiodide. The average particle size, $d_z$, and the polydispersity index of the PSD of the plural BCPNPs produced are 8 nanometers and 0.19, respectively, by TEM and DLS.

EXAMPLE 16

Preparation of Core/shell Block Copolymeric Nanoparticles having a Crosslinked Core, using pSty-b-P4VP and Crosslinking Agent 1,4-dibromobutane.

This example was carried out according to the method of Example 5, except that the concentration of the crosslinkable block copolymer pSty-b-P4VP was 5 weight percent, based on the total weight of solution and 3H (deuterated) DMF was the carrier medium. The weight average molecular weight (Mw) of the block copolymer was 20,500, the weight average molecular weight (Mw) of the pSty block and the P4VP block were 11,800 and 8,700, respectively. The Mw/Mn of the block copolymer was 1.09. The core-shell structure with psty as the shell and crosslinked P4VP as the core was proved by TEM and H1-NMR analysis.1, 4-dibromobutane was used as the crosslining agent. The crosslinking reaction was carried out in 3H (deuterated) DMF at room temperature, and the reaction mixture was assessed using 1H-NMR at hours 0, 10, and 28.

As the crosslinking reaction preceded, the absorption peak (Peak a) of the pyridine group gradually decreased and eventually disappeared. The absorption peak of the benzene group (Peak b), on the other hand, almost did not change. Peak c, which is the combination of the absorption of meta-H of the benzene ring and the ortho-H of pyridine gradually decreased as the reaction proceeded. At 28 hour, the area ratio of Peak b to Peak c approached 3 to 2. Peak d, having appeared due to quaternization, did not continue to increase. In fact, it decreased, as the degree of crosslinking increased. This indicates that because of the crosslinking reaction, the crosslinked blocks of P4VP entered the core and became the rigid core. Because its mobility is constrained, its signal disappeared in NMR of the liquid phase. On the other hand, the signal from the pSty blocks was not affected, indicating that they were still in the solubilized state. This proves that the crosslinking reaction of P4VP resulted in the formation of block copolymeric nanoparticles with crosslinked P4VP as the core and pSty as the shell.

We claim:

1. A method for the preparation of plural block copolymeric nanoparticles, said method comprising the steps of:
   (a) forming a solution by dissolving a crosslinkable block copolymer in a carrier medium, wherein said crosslinkable block copolymer is present in said solution at a concentration of at least 2 weight percent and no more than 32 weight percent, based on the weight of said solution;
   (b) combining at least one crosslinking agent with said solution;
   reacting said crosslinking agent with said crosslinkable block copolymer; and
   optionally, isolating said block copolymeric nanoparticles;
   wherein:
      (i) said crosslinkable block copolymer comprises at least one crosslinkable block and at least one non-crosslinkable block;
      (ii) said crosslinkable block comprises at least one crosslinkable group, or at least one group modifiable to produce a crosslinkable group; and
      (iii) said crosslinkable block copolymer is miscible with said carrier medium at said concentration.

2. The method of claim 1, wherein the amount of said crosslinking agent present in said solution is 0.05 to 10 times the stoichiometric quantity, wherein said stoichiometric quantity is that amount of said crosslinking agent having a total number of crosslinking groups equal to the total number of said crosslinkable groups present in all of the crosslinkable blocks of said crosslinkable block copolymer present in said solution.

3. The method of claim 1, wherein said crosslinkable block copolymer is present in said carrier medium at a concentration of 2 to 30 weight percent, based on the weight of said solution.

4. The method of claim 1, wherein the average particle size of said block copolymeric nanoparticles is 0.005 micron to 0.200 micron.

5. The method of claim 1, wherein the degree of polymerization of said crosslinkable block is 2 to 1,000.

6. The method of claim 1, wherein the degree of polymerization of said non-crosslinkable block is 2 to 2,000.

7. A method of claim 1, wherein said crosslinkable block copolymer comprises two or three blocks.

8. The method of claim 1, wherein the ratio of said crosslinkable block to said non-crosslinkable block is 1:10 to 5:1, wherein said ratio is calculated by dividing the degree of polymerization of said crosslinkable block by the degree of polymerization of said non-crosslinkable block.

9. The method of claim 1, comprising the further steps of:
    adding an ingredient; and
    incorporating said ingredient into said block polymeric nanoparticle;
    wherein said ingredient is an ingredient selected from the group consisting of: pharmaceutically active agent, cosmetic, fragrance, flavor, carrier solvent, diluent, pesticide, herbicide, fertilizer, antimicrobial, colorant, odor absorbing agent, fat absorbing agent, toxin absorbing agent, UV-absorber, liquid crystal, electrically active agent, optically active agent, and combinations thereof.

10. The method of claim 1, comprising the further steps of:
    adding one or more reactants suitable for incorporation into said block polymeric nanoparticles;
    incorporating said reactants into said block polymeric nanoparticles; and
    reacting said reactants within said block polymeric nanoparticles.

11. The method of claim 1, wherein said block copolymeric nanoparticle comprises:
    (i) a core comprising a crosslinked core derived from said crosslinkable block; and
    (ii) a shell comprising said non-crosslinkable block.

12. The method of claim 11, wherein said non-crosslinkable block is miscible with said carrier medium.

* * * * *